O. E. BARTHEL.
MOTOR VEHICLE FRAME.
APPLICATION FILED SEPT. 23, 1914.
1,299,107.
Patented Apr. 1, 1919.
2 SHEETS—SHEET 2.
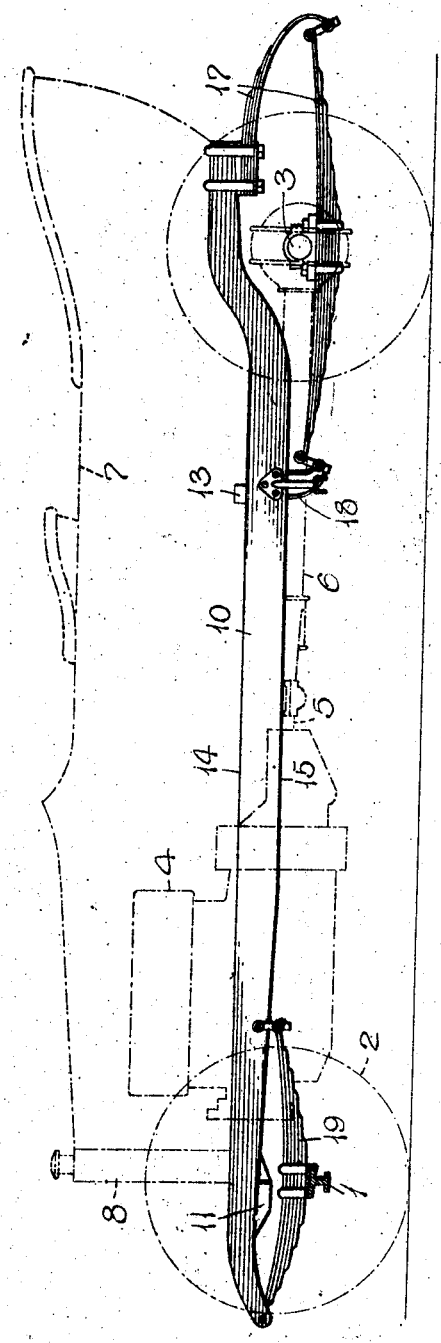
Inventor
Oliver E. Barthel,

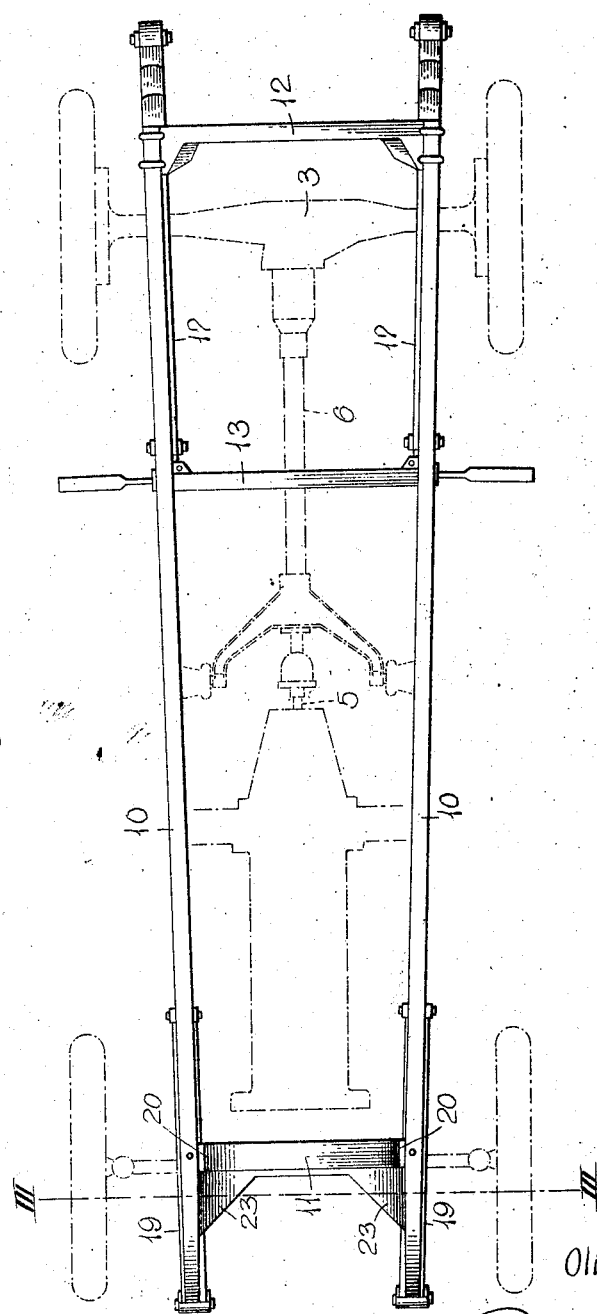

UNITED STATES PATENT OFFICE.

OLIVER E. BARTHEL, OF DETROIT, MICHIGAN.

MOTOR-VEHICLE FRAME.

1,299,107. Specification of Letters Patent. Patented Apr. 1, 1919.

Application filed September 23, 1914. Serial No. 863,072.

*To all whom it may concern:*

Be it known that I, OLIVER E. BARTHEL, a citizen of the United States of America, residing at Detroit, in the county of Wayne and State of Michigan, have invented certain new and useful Improvements in Motor-Vehicle Frames, of which the following is a specification, reference being had therein to the accompanying drawings.

In order to provide the necessary clearance to permit the front supporting wheels of a motor vehicle to turn and also give the desired width of frame for the rear end of the body, it has been the common practice to form an offset or bend in each side channel member of motor vehicle frames intermediate its ends and as this bend comes at the plane of greatest strain, it has been found necessary to strengthen the members along the bend or offset by increasing the width of the web or flanges of the channel iron or otherwise reinforcing it. Special tools and machinery are necessary to bend or offset the frame members in the manner and the liability of imperfections occurring in the manufacture is increased and weight added by the necessary reinforcement.

The object of the invention is to so construct and arrange the side frame members that the propelling or driving thrust of the traction wheels of the motor vehicle will be applied, in the direction of their entire length and the necessary clearance between the frame and front wheels will be secured and a frame having any desired width at its rear end provided without the necessity for bending or offsetting said members laterally of the frame, thus obviating the necessity for reinforcing said members and providing a very light, strong and rigid construction which is cheap to manufacture. A further object is to further lighten and cheapen the frame structure by obviating the necessity for spring hangers and to provide certain other new and useful features in the construction and arrangement of parts.

To these ends the invention consists in the matters hereinafter set forth and more particularly pointed out in the appended claims, reference being had to the accompanying drawings in which—

Figure 1 is a plan view of a motor vehicle frame embodying the invention;

Fig. 2 is a side elevation of the same;

Fig. 3 an enlarged transverse section substantially upon the line III—III of Fig. 1;

Fig. 4 is a transverse section through a front cross member of the frame, upon the line IV—IV of Fig. 3; and Fig. 5 is a plan view of one end of said cross member attached.

The front axle 1, with its pivotally attached guiding wheels 2, the rear axle 3, the motor 4 with shaft 5 for transmitting motion from the motor to the rear axle, the torque member 6 pivotally connected to the side members of a chassis frame and the vehicle body 7 and radiator 8 mounted on said frame, are all indicated in dotted lines in the accompanying drawing as they, specifically form no part of the invention and may be of any suitable form, construction or design.

The chassis frame embodying this invention comprises longitudinally extending side channel members or bars 10 which are tied together by means of cross members 11 and 12 near the front and rear ends respectively of said side members, and an intermediate cross member 13, the members 12 and 13 being of any suitable form and construction and riveted or otherwise rigidly secured at their ends to the side members 10. The members 10, in plan view are straight throughout their length without lateral bends or offsets and are of substantially uniform width, that is the upper flange 14 and the lower flange 15 of each channel member 10 are of substantially equal and uniform width throughout the length of each member and the body or web 16 extends in a continuous longitudinal vertical plane. The cross members are of different length the front member 11 being the shortest and the rear member 12 the longest so that the side members 10 are tied together in a forwardly convergent position in plan view to form a frame which gradually tapers forwardly from its rear end. The frame is thus made sufficiently narrow at its forward end to permit the front wheels 2 to turn upon their pivotal connection to the front axle in guiding the vehicle and is preferably of such a width at its rear end to permit of placing the supporting springs 17 directly beneath said side members and securing them to the rear axle, thus obviating the necessity for providing laterally extending spring hangers. When these springs are of the three-quarter elliptic type as shown, the quarter spring members may be clipped directly to the under side of the end of each member 10 and the forward end of the half spring member may be attached to a short hanger 18 extending downward from the frame member. The semi-elliptic springs 19 are also placed directly beneath the forward ends of the members 10 and clipped to the front axle in the usual manner, their ends being pivotally connected to the frame members in any suitable manner.

In the construction shown, the rear springs 17 are clipped to the under side of the rear axle to position the body low down and at the same time give the necessary road clearance and in order to give the necessary clearance between the axle and frame to permit the spring to act freely, the side frame members 10 are bent upwardly at a point just forward of the axle but it will be understood that these members may be straight or bent in any other manner in their vertical plane, to conform to the particular car construction in which they are embodied without departing from the spirit of this invention.

For the purpose of strength, resiliency, lightness and cheapness, the front cross member 11 is preferably formed from a piece of sheet metal with rectangular or box-like end portions 20 which are riveted or otherwise rigidly secured with the channels of the members 10 and these end portions are connected by a depressed portion or bridge 21 which in cross section is in the form of an angle bar with a forwardly extending flange 22 integral with the lower edge of the forward flange of the bridge, said flange 22 being widened at each end and extended and properly shaped to form angle plates or portions 23 to fill the angles between the frame members and the bridge at the forward side thereof. These angle plates are riveted to the lower flange of the channel bars 10 and thus form very strong corner braces which prevent any relative longitudinal movement of said channel bars or racking of the frame. The bridge is suitably depressed and formed to provide a seat for the radiator 8 which is detachably secured thereto, being of angle construction with the integral angle plates, makes a very strong and light construction which will yield slightly under very heavy strain without breaking or becoming permanently distorted.

By placing the side frame members 10 in forwardly convergent relation instead of in parallelism as commonly arranged, the strength of the frame is increased without the necessity for reinforcement and channel bars of lighter weight may be used because the driving thrust is endwise of the side members throughout their length, said members being without lateral bends or offsets. The frame may be of any desired width at its rear end without materially lessening its strength, and the rear springs may therefore be secured directly to the frame members and to the axle near the ends thereof to give a wide support for the body, thus obviating the necessity for laterally projecting spring hangers and the unsightly arrangement of springs outside the vertical plane of the body.

While the invention is shown as embodied in an automobile construction, it is obvious that it may be used as the frame for any motor vehicle and changes may be made in the details of construction without departing from the spirit of the invention and I do not therefore limit myself to the particular construction shown.

Having thus fully described my invention what I claim is:—

1. A frame for motor vehicles comprising longitudinal side members and cross members connecting the side members, said cross member at the forward end of the frame being formed from a single piece of sheet metal with a bridge portion secured at its ends to the side frame members and integral angle plates at the forward side of the bridge secured along one edge to the side frame members and forming angle braces in the angles between the bridge and side members.

2. A frame for motor vehicles comprising longitudinal side channel members and cross members connecting the side members, the cross members at the forward end of the frame being formed from a single sheet of metal with end portions secured in the channels of the side members, a bridge portion connecting the end portions, said bridge being depressed between the end portions to form a seat for a radiator, and a forwardly extending flange integral with the bridge and having end portions secured at one edge to the channel side members to form angle plates in the angles between the bridge and said members.

3. In a motor vehicle, the combination of a frame having a pair of longitudinal side members which are straight in plan view of the frame and curved in side elevation, and cross members of different lengths rigidly connecting the side members and holding the same in forwardly convergent relation, and springs for supporting the rear ends of said side members directly connected thereto and extending longitudinally thereof in the longitudinal vertical plane of said members.

In testimony whereof I affix my signature in presence of two witnesses.

OLIVER E. BARTHEL.

Witnesses:
KARL H. BUTLER,
GENEVIEVE E. McGRANN.